(12) United States Patent
Seong et al.

(10) Patent No.: US 10,379,749 B2
(45) Date of Patent: Aug. 13, 2019

(54) SEMICONDUCTOR DEVICE AND OPERATING METHOD THEREOF

(71) Applicant: SAMSUNG ELECTRONICS CO., LTD., Suwon-si, Gyeonggi-Do (KR)

(72) Inventors: Nak Hee Seong, Gwacheon-si (KR); Sang Youn Lee, Seoul (KR); Seong Min Jo, Seoul (KR); Yun Kyo Cho, Suwon-si (KR); Dong Soo Kang, Hwaseong-si (KR); Byeong Jin Kim, Seoul (KR); Jae Geun Yun, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 198 days.

(21) Appl. No.: 15/423,628

(22) Filed: Feb. 3, 2017

(65) Prior Publication Data
US 2017/0228169 A1 Aug. 10, 2017

(30) Foreign Application Priority Data
Feb. 4, 2016 (KR) .................. 10-2016-0014250

(51) Int. Cl.
*H04L 12/26* (2006.01)
*H04L 12/24* (2006.01)
*G06F 3/06* (2006.01)
*G06F 13/364* (2006.01)
*G06F 13/42* (2006.01)

(52) U.S. Cl.
CPC .......... *G06F 3/0611* (2013.01); *G06F 3/0653* (2013.01); *G06F 3/0685* (2013.01); *G06F 13/364* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 5,919,268 A | 7/1999 | McDonald | |
| 6,038,606 A * | 3/2000 | Brooks | H04L 1/1854 370/229 |
| 6,775,640 B1 | 8/2004 | Swanson et al. | |
| 8,032,329 B2 | 10/2011 | Chou et al. | |

(Continued)

FOREIGN PATENT DOCUMENTS

JP 2002-117700 4/2002

*Primary Examiner* — Hyun Nam
(74) *Attorney, Agent, or Firm* — Volentine, Whitt & Francos, PLLC

(57) ABSTRACT

An operating method of a semiconductor device includes monitoring multiple request packets and multiple response packets that are being transmitted between a master device and a slave device. A target request packet that matches predefined identification (ID) information is detected from among the request packets. An operation of a latency counter is initiated. The operation is for measuring the latency of a communication exchange (transaction) that includes the target request packet and a target response packet that is one of the response packets that matches the predefined ID information. The target response packet is detected from among the response packets. The operation of the latency counter is terminated. A latency value of the communication exchange is acquired from the latency counter.

14 Claims, 12 Drawing Sheets

(56) References Cited

U.S. PATENT DOCUMENTS

| | | |
|---|---|---|
| 8,401,821 B1 | 3/2013 | Sertamo |
| 8,489,792 B2 | 7/2013 | Byrne et al. |
| 8,943,249 B2 | 1/2015 | Kwon et al. |
| 2007/0036082 A1* | 2/2007 | Sonksen ............... G06F 11/221 370/242 |
| 2008/0089340 A1* | 4/2008 | Tong ................... G06F 11/2221 370/392 |
| 2012/0331034 A1 | 12/2012 | Fawaz et al. |
| 2015/0281028 A1 | 10/2015 | Akhter et al. |
| 2016/0142280 A1* | 5/2016 | Krishnamoorthy ......................... G01R 31/31727 703/20 |
| 2017/0237636 A1* | 8/2017 | Yun .................... H04L 43/0858 709/224 |

* cited by examiner

1200

1300

1400

SEMICONDUCTOR DEVICE AND OPERATING METHOD THEREOF

This application claims priority under 35 U.S.C. § 119 to Korean Patent Application No. 10-2016-0014250, filed on Feb. 4, 2016 in the Korean Intellectual Property Office, the disclosure of which is incorporated herein by reference in its entirety.

BACKGROUND

1. Field of the Disclosure

The present disclosure relates to a semiconductor device and an operating method thereof.

2. Background Information

A System-on-Chip (SoC) enables data transmissions between various Intellectual Property (IP) blocks that use high-performance On-Chip Interconnects (OCIs). The On-Chip Interconnects may transmit multiple communication exchanges (transactions) between, for example, an arbitrary master device and a slave device. A channel formed between the master device and the slave device may be monitored by a monitoring device for the purpose of, for example, performing debugging or Quality-of-Service (QoS) control or tracking the occurrence of a particular event defined by a user.

SUMMARY

Example embodiments of the present disclosure provide an operating method of a semiconductor device for efficiently measuring the latency in a channel formed between a master device and a slave device of a System-on-Chip (SoC).

Example embodiments of the present disclosure also provide a semiconductor device for efficiently measuring the latency in a channel formed between a master device and a slave device of a System-on-Chip.

However, example embodiments of the present disclosure are not restricted to those set forth herein. The above and other example embodiments of the present disclosure will become more apparent to one of ordinary skill in the art to which the present disclosure pertains by referencing the detailed description of the present disclosure given below.

According to an example embodiment of the present disclosure, an operating method of a semiconductor device includes monitoring multiple request packets and multiple response packets (e.g., that are sent responsive to the request packets) that are being transmitted between a master device and a slave device. A target request packet that matches predefined identification (ID) information is detected from among the request packets. An operation of a latency counter is initiated. Latency is a time interval between a cause and effect, such as between a request packet that is sent as a cause and a response packet that is responsive to the request packet as an effect. The latency counter is for measuring the latency of a communication exchange (transaction) that includes the target request packet and a target response packet that is one of the response packets that matches the predefined ID information. The target response packet is detected from among the response packets. The operation of the latency counter is terminated. A latency value of the communication exchange is acquired from the latency counter.

According to another example embodiment of the present disclosure, an operating method of a semiconductor device includes monitoring multiple communication exchanges (transactions) between a first Intellectual Property (IP) block and a second Intellectual Property (IP) block, which are provided in a System-on-Chip (SoC). Predefined first ID information and predefined second ID information are received from outside the SoC. The latency of a first transaction that is one of the communication exchanges that matches the first ID information is measured by using a latency counter. The latency of a second transaction that is one of the communication exchanges that matches the second ID information is measured by using the latency counter. An average latency and a peak latency are computed based on the measured latency of the first transaction and the measured latency of the second transaction.

According to still another example embodiment of the present disclosure, a semiconductor device includes a filtering module that detects a target request packet that matches predefined ID information from among multiple request packets that are being transmitted between a master device and a slave device. A configuration module receives the predefined ID information and provides the predefined ID information to the filtering module. A latency counter measures the latency of a communication exchange (transaction) that includes the target request packet and a target response packet that is one of the response packets that matches the predefined ID information. A control module controls an operation of the latency counter and detects the target response packet from among the response packets.

Other features and aspects will be apparent from the following detailed description, the drawings, and the claims.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
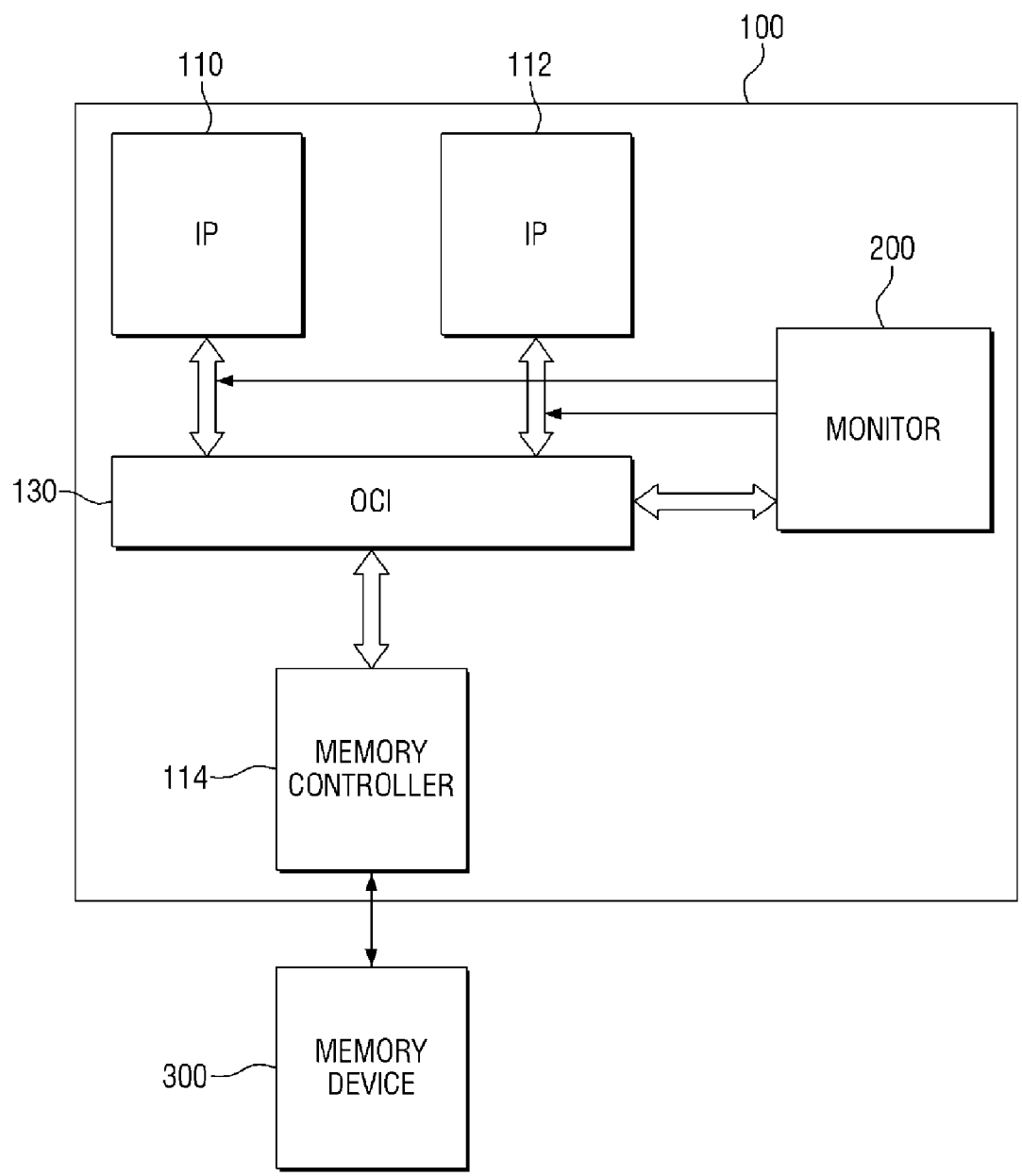
FIG. 1 is a schematic block diagram of a semiconductor device according to an example embodiment of the present disclosure.

Embodiments will be described in detail with reference to the accompanying drawings. The concepts described herein, however, may be embodied in various different forms, and should not be construed as being limited only to the illustrated embodiments. Rather, these embodiments are provided as examples so that this disclosure will be thorough and complete, and will fully convey the concepts to those skilled in the art. Accordingly, known processes, elements, and techniques are not described with respect to some of the embodiments of the concepts described herein. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which the concepts described herein belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Advantages and features of the present disclosure and methods of accomplishing the same may be understood more readily by reference to the following detailed description of preferred embodiments and the accompanying drawings.

FIG. 1 is a schematic block diagram of a semiconductor device according to an example embodiment of the present disclosure.

Referring to FIG. 1, a semiconductor device 100 includes one or more Intellectual Property (IP) blocks 110 and 112 and a monitoring device 200. In some example embodiments, the semiconductor device 100 may further include a memory controller 114, and the memory controller 114 may also be implemented as an Intellectual Property (IP) block. Intellectual Property blocks as described herein communicate using packets in accordance with an Intellectual Property (IP) standard.

The semiconductor device 100 is an Integrated Circuit (IC) including typical computer elements such as a processing unit, a controller, an interface, and the like. For example, the semiconductor device 100 may include a System-on-Chip (SoC). The computer elements may be implemented as Intellectual Property (IP) blocks that communicate using Intellectual Property packets that carry data. Examples of the IP blocks 110 and 112 may include a Central Processing Unit (CPU) and a Graphic Processing Unit (GPU), but the present disclosure is not limited thereto.

The IP blocks 110 and 112 and the memory controller 114 may be implemented on a single silicon die, and may exchange data with each other via an on-chip interconnect (OCI) 130. The memory controller 114 may control a memory device 300.

The monitoring device 200 monitors communication exchanges (transactions) between the IP blocks 110 and 112 and the memory controller 114, which exchange data with each other via the OCI 130. By monitoring data exchanged via the OCI 130, channels formed between the IP blocks 110 and 112 and the memory controller 114 may be debugged, Quality of Service (QoS) may be controlled, or the occurrence of a particular event defined by a user may be tracked.

The monitoring device 200 may perform transaction monitoring at any desired location in the semiconductor device 100. As illustrated in FIG. 1, the monitoring device 200 may monitor a transaction associated with the IP Block 110 or a transaction associated with the IP block 112. However, the locations at which the monitoring device 200 performs transaction monitoring are not limited to those illustrated in FIG. 1, and may include various other arbitrary locations inside the semiconductor device 100 depending on the intended use of the semiconductor device 100.

A communication exchange (transaction) includes a request packet and a response packet (e.g., sent in response to the request packet). For example, a read transaction and a write transaction may occur between the IP block 110, which operates as a master device, and the memory controller 114, which operates as a slave device. More specifically, for a read transaction, in response to the IP block 110 transmitting a read request packet to the memory controller 114, the memory controller 114 may transmit a read response packet to the IP block 110 as a response to the read request packet.

In a case in which multiple master/slave relationships are established in the semiconductor device 100 or multiple tasks are allocated to a single master/slave relationship, multiple transactions may be monitored in the semiconductor device 100. In this case, multiple request packets and multiple response packets may be transmitted between a master device and a slave device.

In some example embodiments, each of the request packets and the response packets may include identification (ID) information. More specifically, each of the request packets and the response packets may include at least one of transaction ID information and transaction attribute information for uniquely identifying each transaction. For example, the transaction ID information may include unique ID information for identifying a master device or a slave device. The transaction attribute information may include burst length attribute information and cache snooping type attribute information. If there exist multiple transactions, each of the transactions may be identified using the transaction ID information and the transaction attribute information.

Figure 2:
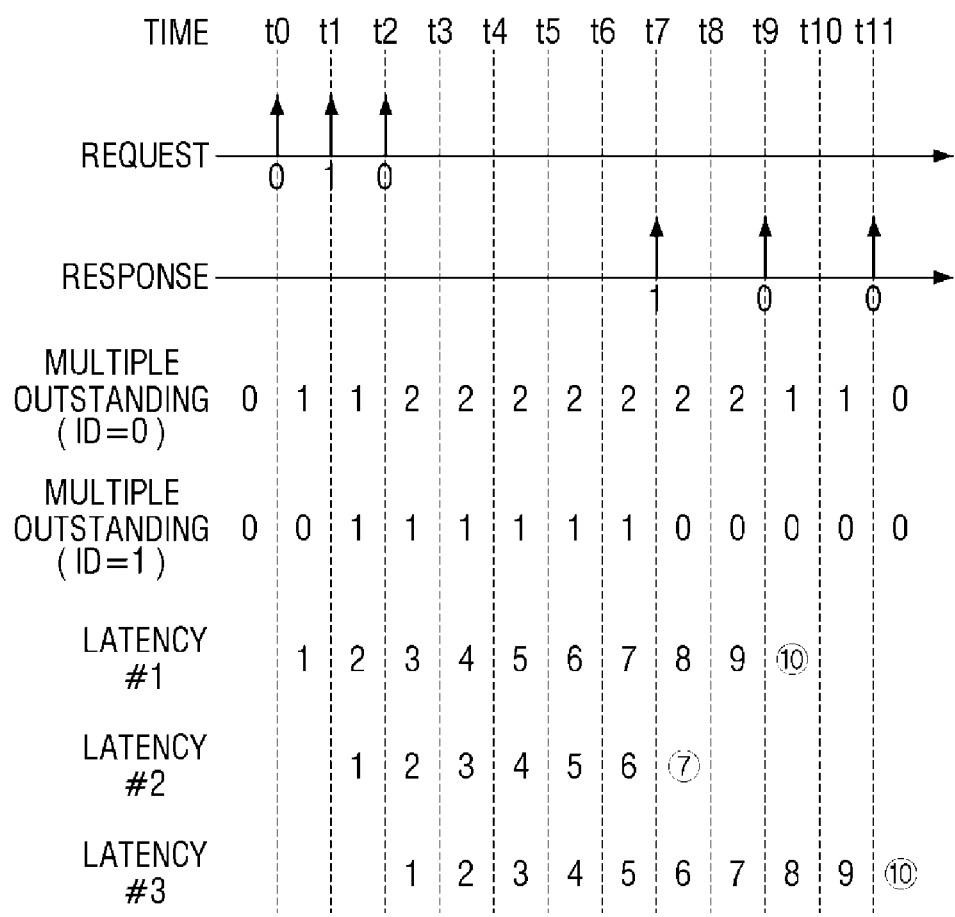
FIG. 2 is a timing diagram for explaining how to measure the latency in a channel formed between a master device and a slave device of the semiconductor device according to the example embodiment of FIG. 1.

FIG. 2 is a timing diagram for explaining how to measure the latency in a channel formed between a master device and a slave device of the semiconductor device according to the example embodiment of FIG. 1.

More specifically, FIG. 2 illustrates the results of performing transaction monitoring at a desired location in the semiconductor device 100 by using the monitoring device 200.

Referring to FIG. 2, three request packets having transaction IDs of 0, 1, and 0, respectively, are sequentially detected at times t0, t1, and t2, respectively. At a time t7, a response packet corresponding to the request packet detected at the time t1 with a transaction ID of 1 is detected. Response packets respectively corresponding to the request packets detected at the times t0 and t2 with a transaction ID of 0 are detected at times t9 and t11, respectively.

In a case in which multiple response packets are detected, as illustrated in FIG. 2, they can be identified by their respective transaction IDs if they correspond to request packets having different transaction IDs. On the other hand, the order in which response packets for request packets having the same transaction ID are detected follows the order in which the request packets having the same transaction ID are detected. That is, the order in which the response packets for the request packets detected at the times t0 and t2 with a transaction ID of 0 (for example, the response packets at the times t9 and t11) are detected follows the order in which the corresponding request packets are detected. Accordingly, even response packets for request packets having the same transaction ID can also be properly identified.

The semiconductor device 100 may count the number of request packets with corresponding response packets that are yet to be detected. FIG. 2 shows a Multiple Outstanding (MO) count value for a case in which a target transaction ID is 0 and an MO count value for a case in which the target transaction ID is 1.

For example, in a case in which the target transaction ID is 0, an MO count value is increased by 1 to a value of 1 upon the detection of the request packet having a transaction ID of 0 at the time t0. The MO count value is increased again by 1 to a value of 2 upon the detection of the request packet having a transaction ID of 0 at the time t2. Then, the MO count value is lowered by 1 to a value of 1 upon the detection of the response packet having a transaction ID of 0 at the time t9 and is lowered again by 1 to a value of 0 upon the detection of the response packet having a transaction ID of 0 at the time t11.

In another example, in a case in which the target transaction ID is 1, the MO count value is increased by 1 to a value of 1 upon the detection of the request packet having a transaction ID of 1 at the time t1 and is lowered by 1 to a value of 0 upon the detection of the response packet having a transaction ID of 1 at the time t7.

To compute an MO count value, the semiconductor device 100 may use an MO counter that will be described later with reference to FIG. 3.

Latency needs to be measured to debug a channel formed in the semiconductor device 100 or to control QoS. Latency may be measured by measuring the amount of time that it takes for a response packet for a request packet to be generated in a channel formed between a master device and a slave device. From the viewpoint of the monitoring device 200, latency may be measured by measuring the amount of time from the detection of a request packet to the detection of a response packet for the request packet.

For example, the latency of a transaction that includes the request packet detected at the time t0 with a transaction ID of 0 may be measured to be 10. That is, the latency in this example is the amount of time from the time t0 (i.e., when the request packet having a transaction ID of 0 is detected) to the time t9 (i.e., when a response packet for the request packet having a transaction ID of 0 is detected). Similarly, the latency of a transaction including the request packet detected at the time t1 with a transaction ID of 1 may be measured to be 7. In this example, the latency is the amount of time from the time t1 (i.e., when the request packet having a transaction ID of 1 is detected) to the time t7 (i.e., when a response packet for the request packet having a transaction ID of 1 is detected).

As mentioned above, if multiple transactions are performed in the channel formed in the semiconductor device 100, latency counting needs to be performed for each of the transactions to measure the latency of each of the transactions. However, this consumes a considerable amount of resources of the semiconductor device 100 such as latency counters. For example, in order to measure the latency of n transactions (where n is a natural number), at least n latency counters may be needed, and m MO counters may be needed if there are m transaction IDs (where m is a natural number not greater than n).

Figure 3:
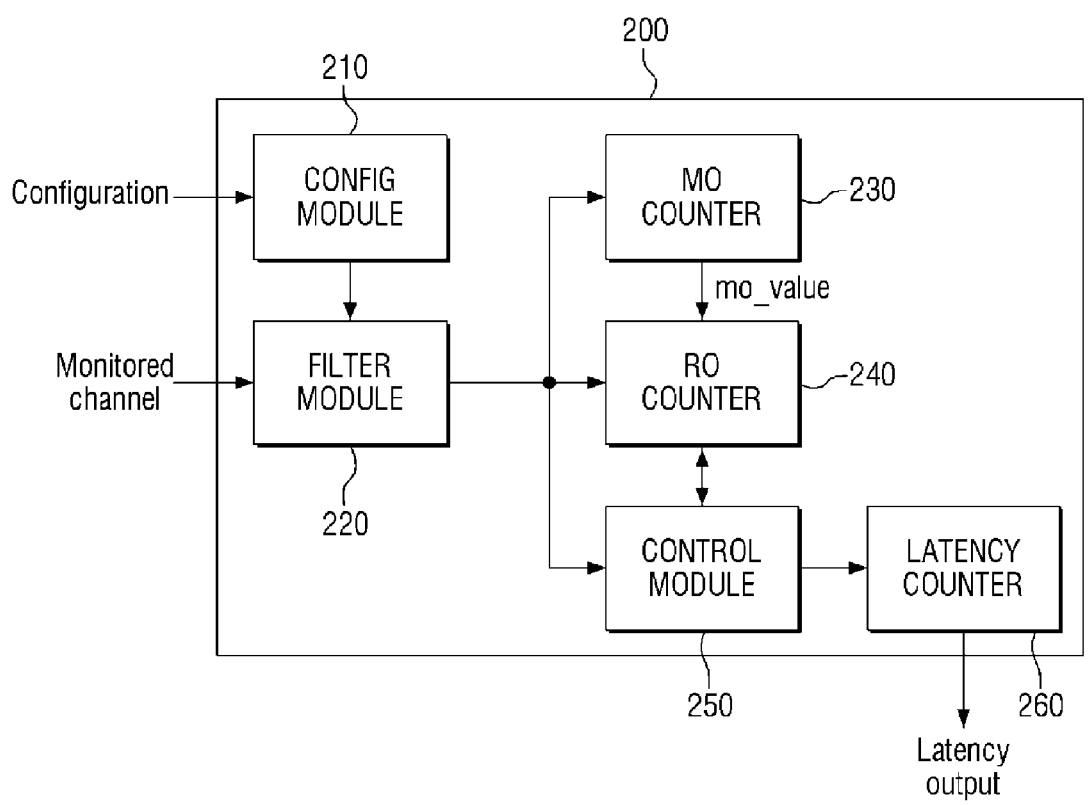
FIG. 3 is a schematic block diagram of a monitoring device of the semiconductor device according to the example embodiment of FIG. 1.

FIG. 3 is a schematic block diagram of a monitoring device of the semiconductor device according to the example embodiment of FIG. 1.

Referring to FIG. 3, the monitoring device 200 includes a configuration module 210, a filtering module 220, an MO counter 230, a Response Ordering (RO) counter 240, a control module 250, and a latency counter 260.

The configuration module 210 receives predefined ID information from outside the monitoring device 200 and provides the predefined ID information to the filtering module 220. In some example embodiments, only a transaction that matches the predefined ID information, from among other transactions that are being transmitted over the channel formed in the semiconductor device 100, is monitored. The predefined ID information may be ID information configured in advance by a user or an application and received from outside the monitoring device 200 or the semiconductor device 100. However, the present disclosure is not limited to these example embodiments. That is, the predefined ID information may be stored in a particular IP block in the monitoring device 200 or the semiconductor device 100.

In some example embodiments, the predefined ID information, which is provided by the configuration module 210, may include at least one of transaction ID information and transaction attribute information. For example, the transaction ID information may include unique ID information for identifying a master device or a slave device. The transaction attribute information may include burst length attribute information and cache snooping type attribute information.

The filtering module 220 detects a target request packet that matches the ID information provided by the configuration module 210 from among multiple request packets that are being transmitted over a channel between a master device and a slave device. This is for measuring latency only for the target request packets that match the ID information provided by the configuration module 210.

The MO counter 230 counts the number of request packets with corresponding response packets that are yet to be detected, from among the request packets.

The RO counter 240 determines whether a response packet has been detected for each of the request packets. More specifically, when latency measurement is initiated, the RO counter 240 receives an MO count value mo_value from the MO counter 230 and sets the MO count value mo_value as its initial count value. During latency measurement, the RO counter 240 lowers an RO count value resp_ordering whenever a response packet is detected for any one of the request packets.

The latency counter 260 will hereinafter be described. The latency counter 260 measures the latency of a transaction including the target request packet and a target response packet that matches the predefined ID information.

The control module 250 detects the target response packet from among the response packets that are being transmitted over the channel between the master device and the salve device. The control module 250 controls the latency counter 260 and may thus initiate or terminate the operation of the latency counter 260. For example, the control module 250 terminates the operation of the latency counter 260 when the RO count value resp_ordering of the RO counter 240 reaches zero.

Figure 4:
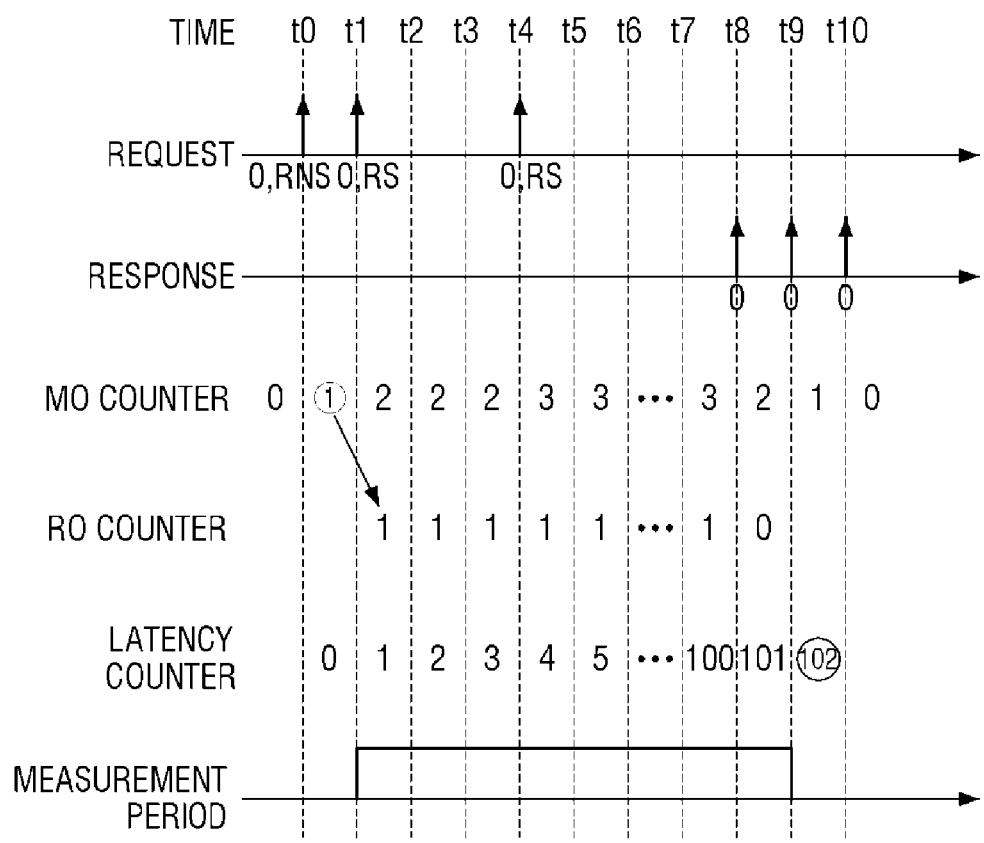
FIG. 4 is a timing diagram for explaining an operating method of a semiconductor device, according to an example embodiment of the present disclosure.
Figure 5:
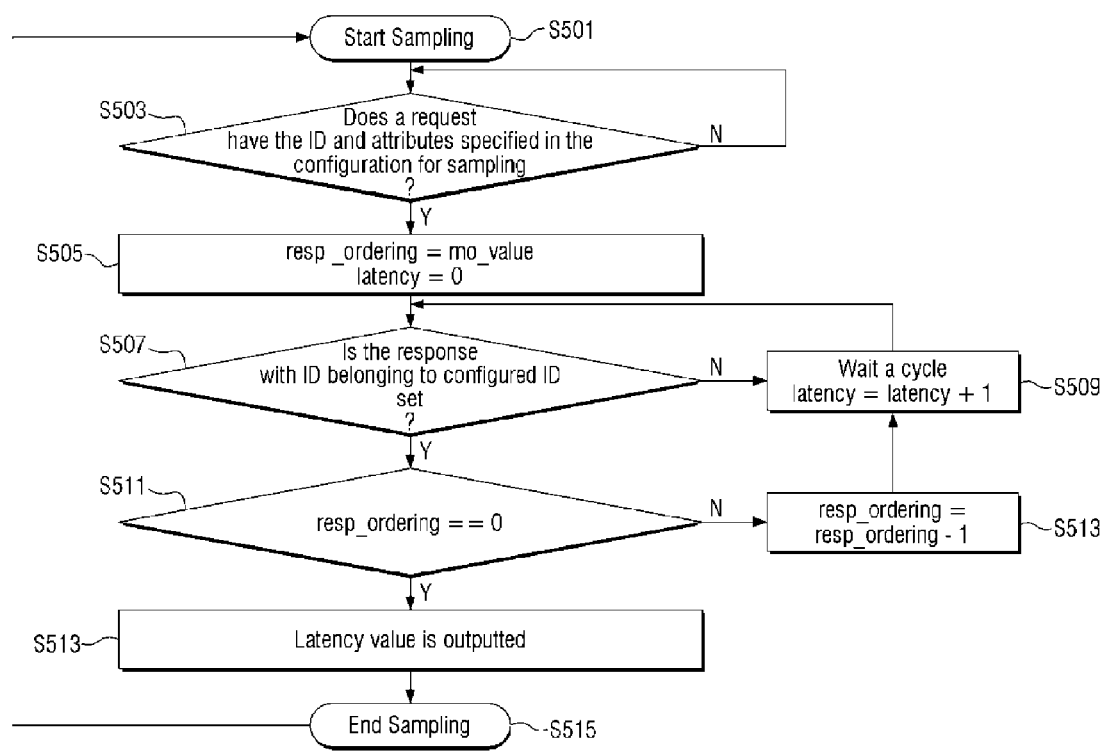
FIG. 5 is a flowchart illustrating the operating method according to the example embodiment of FIG. 4.

FIG. 4 is a timing diagram for explaining an operating method of a semiconductor device, according to an example embodiment of the present disclosure. FIG. 5 is a flowchart illustrating the operating method according to the example embodiment of FIG. 4.

Referring to FIGS. 4 and 5, an operating method of a semiconductor device, according to an example embodiment of the present disclosure, includes monitoring multiple request packets and multiple response packets that are being transmitted between a master device and a slave device. In some example embodiments, the master device may correspond to a first IP block provided in an SoC, and the slave device may correspond to a second IP block provided in the SoC.

It is assumed that a target transaction to be subjected to latency measurement is a transaction having a transaction ID of 0 and having a "Read-Shared" ("RS") value as cache snooping type attribute information. Accordingly, transactions having a transaction ID of nonzero and having a "Read-No-Snoop" ("RNS") value as cache snooping type attribute information are excluded from latency counting. Identification information for detecting a target transaction may be provided by the configuration module 210.

The sampling of the request packets and the response packets is initiated (S501). Thereafter, a determination is made as to whether a request packet detected over a channel between the master device and the slave device matches the ID information provided by the configuration module 210 (S503). A request packet detected at a time t0 has a transaction ID of 0, but has the "RNS" value as cache snooping type attribute information. Thus, the request packet detected at the time t0 is excluded from latency counting. A request packet detected at a time t1 has a transaction ID of 0 and has the "RS" value as cache snooping type attribute information. Thus, the request packet detected at the time t1 matches the ID information provided by the configuration module 210. Accordingly, the request packet detected at the time t1 is selected as a target request packet.

Thereafter, once the request packet detected at the time t1 is selected as the target request packet, the MO count value mo_value of the MO counter 230 is set as the initial count value of the RO counter 240. That is, the MO count value mo_value of 1 is set as the initial count value of the RO counter 240 (S505). Then, the operation of the latency counter 260 is initiated.

Thereafter, a target response packet corresponding to the request packet detected at the time t1 is detected. More specifically, a determination is made as to whether a response packet detected over the channel between the master device and the slave device matches the ID information of the request packet detected at the time t1, for example, the transaction ID of the request packet detected at the time t1 (S507). The latency counter 260 continues to increase a latency count value by, for example, 1, until a response packet corresponding to the target request packet arrives. For example, the latency counter 260 continues to increase the latency count value by, for example, 1, until a response packet that matches the ID information of the target request packet arrives.

If the detected response packet matches the ID information of the request packet detected at the time t1, the RO count value resp_ordering of the RO counter 240 is checked (S511). For example, a response packet detected at a time t9 matches the ID information of the request packet detected at the time t1. If the RO count value resp_ordering is 1 or greater, the RO count value resp_ordering is lowered by, for example, 1 (S513), and latency counting is continued.

On the other hand, if the RO count value resp_ordering is 0, which means that latency counting is complete, a latency value is output (S513). Referring to FIG. 4, since the RO count value resp_ordering becomes zero after a time t8, a latency value of 102 is output.

Thereafter, sampling is completed (S515), and for a new sampling process, the detection of another target request packet that matches the ID information provided by the configuration module 210 is performed again.

In the operating method according to the example embodiment of FIGS. 4 and 5, the latency of only some transactions is measured using a sampling technique, instead of measuring the latency of each and every transaction individually. Thus, the use of the resources of the semiconductor device 100 such as the MO counter 230, the RO counter 240, and the latency counter 260 can be minimized. Also, a latency value with sufficiently high precision for tasks such as debugging and QoS control can be obtained while conserving the resources of the semiconductor device 100.

For example, an average latency and a peak latency that are computed based on multiple latency values may be used to perform tasks such as debugging and QoS control on the semiconductor device 100. According to the present disclosure, an average latency and a peak latency with sufficiently high precision can be acquired while consuming only a small amount of resources.

In addition, a target transaction to be subjected to latency measurement can be customized. Thus, tasks such as debugging and QoS control can be performed in a properly customized manner for each individual application environment. For example, by setting an ID value for identifying a particular device as a target transaction ID for latency measurement, latency measurement can be performed only on transactions having a transaction ID desired by a user.

Figure 6:
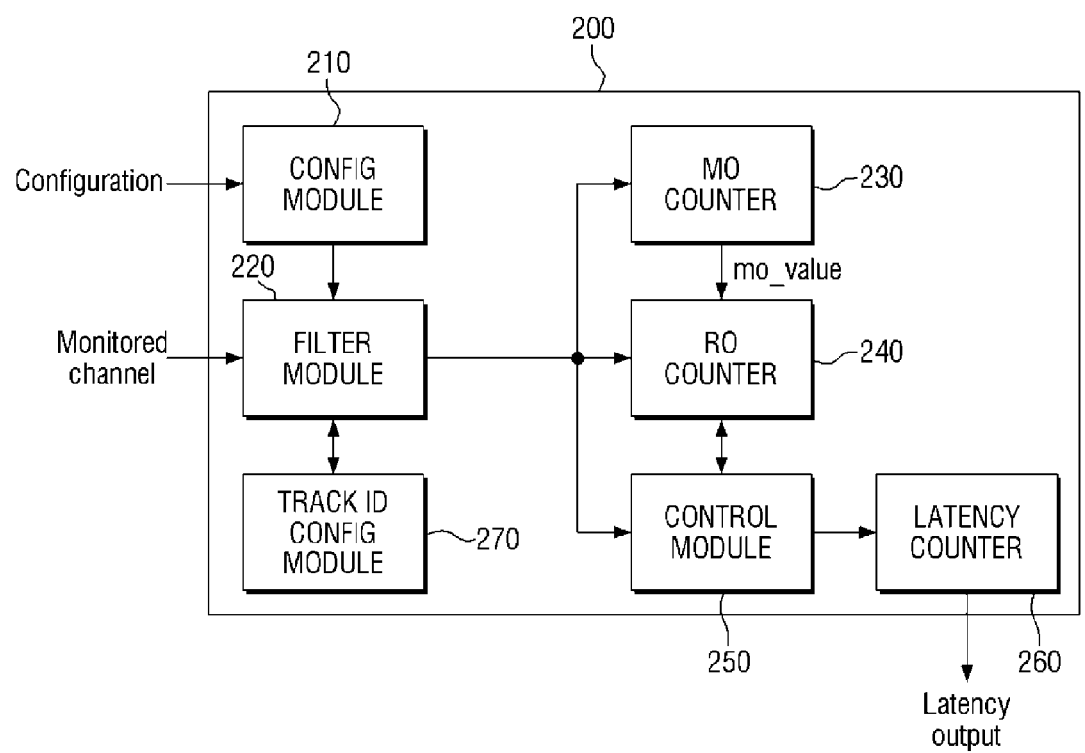
FIG. 6 is a schematic block diagram of a monitoring device of a semiconductor device according to another example embodiment of the present disclosure.

FIG. 6 is a schematic block diagram of a monitoring device of a semiconductor device according to another example embodiment of the present disclosure.

Referring to FIG. 6, a monitoring device 200 includes a configuration module 210, a filtering module 220, an MO counter 230, an RO counter 240, a control module 250, a latency counter 260, and a tracked ID configuration module 270.

The configuration module 210, the filtering module 220, the MO counter 230, the RO counter 240, the control module 250, and the latency counter 260 are the same as their respective counterparts of FIG. 3. Thus, detailed descriptions thereof will be omitted.

The tracked ID configuration module 270 configures current tracked ID information using ID information provided by the configuration module 210. The current tracked ID information is used to store a target transaction ID for latency measurement, for example, in case a channel formed between a master and a slave device is busy. In other words, if the current tracked ID information is set to, for example, 1, only request packets and response packets having a transaction ID of 1 are subjected to latency measurement, regardless of a transaction ID included in the ID information provided by the configuration module 210, while the channel formed between the master device and the slave device is being busy.

The filtering module 220 determines the state of the channel formed between the master device and the slave device. Then, if the channel formed between the master device and the slave device is idle, the filtering module 220 detects each request packet that matches the ID information provided by the configuration module 210 as a target request packet. On the other hand, if the channel formed between the master device and the slave device is busy, the filtering module 220 detects each request packet that matches the current tracked ID information as a target request packet.

Figure 7:
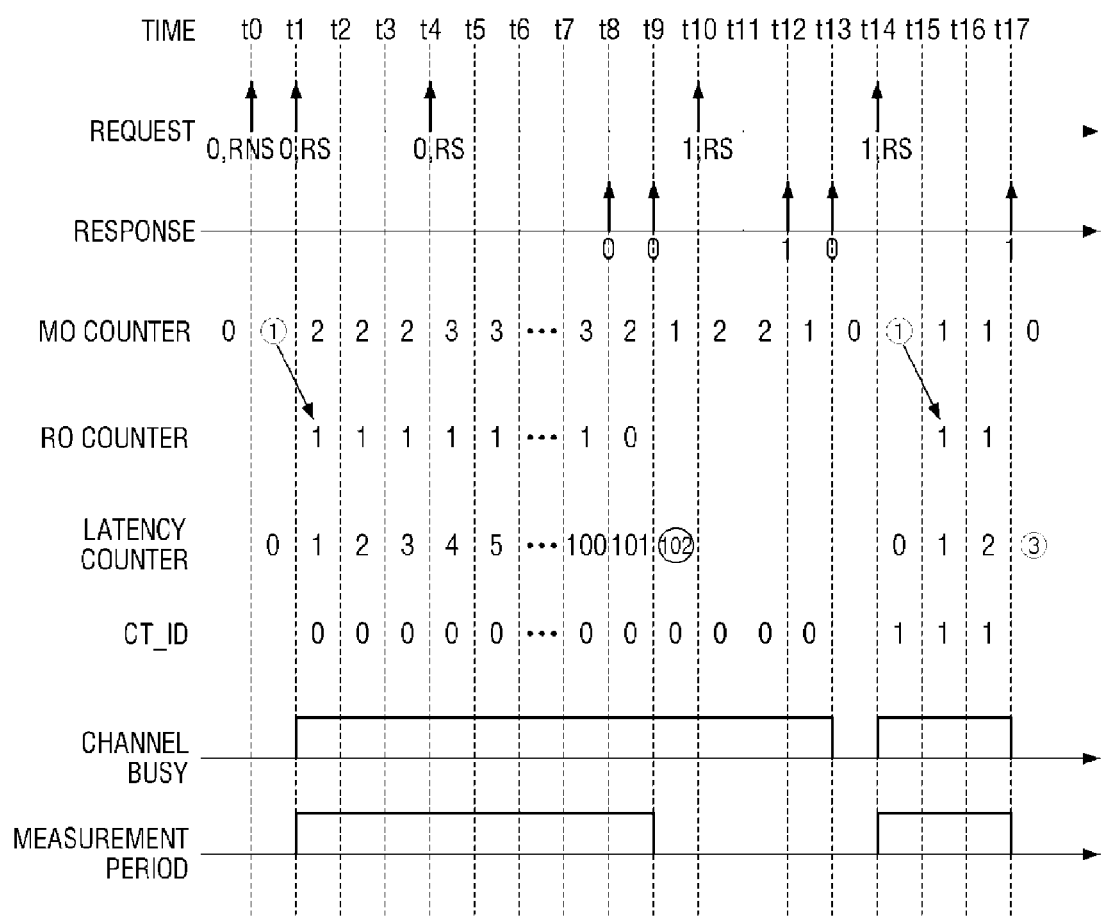
FIG. 7 is a timing diagram for explaining an operating method of a semiconductor device, according to another example embodiment of the present disclosure.

FIG. 7 is a timing diagram for explaining an operating method of a semiconductor device, according to another example embodiment of the present disclosure.

It is assumed that a target transaction to be subjected to latency measurement is a transaction having a transaction ID of 0 and having a "RS" value as cache snooping type attribute information. Accordingly, transactions having a transaction ID of nonzero and having a "RNS" value as cache snooping type attribute information are excluded from latency counting. Identification information for detecting a target transaction may be provided by the configuration module 210. Since the transaction ID of the target transaction is 0, current tracked ID information may also be set to 0.

A channel formed between a master device and a slave device is busy during a period from a time t1 to a time t13. Thus, latency measurement is performed only on request packets and response packets having a current tracked ID of 0 and having the "RS" value as cache snooping type attribute information, detected during the period from the time t1 to the time t13. Since the channel between the master device and the slave device is busy during the period from the time t1 to the time t13, any request packet having a transaction ID of 1, detected during the period from the time t1 to the time t13, is excluded from selection as a target request packet. Accordingly, latency measurement is performed during only part of the period from the time t1 to the time t13, i.e., during a period from the time t1 to a time t9.

The operating method according to the example embodiment of FIG. 7 can lower a sampling rate, and at the same time, can enhance the precision of latency measurement, compared to the operating method that has been described above with reference to FIGS. 3 through 6.

Figure 8A:
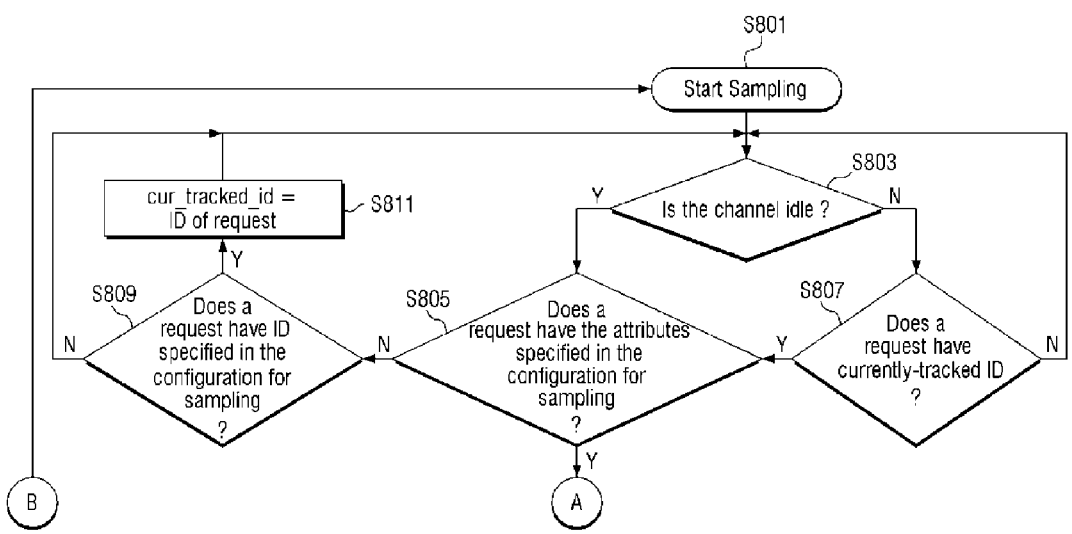
FIGS. 8A and 8B are flowcharts illustrating the operating method according to the example embodiment of FIG. 7.
Figure 8B:
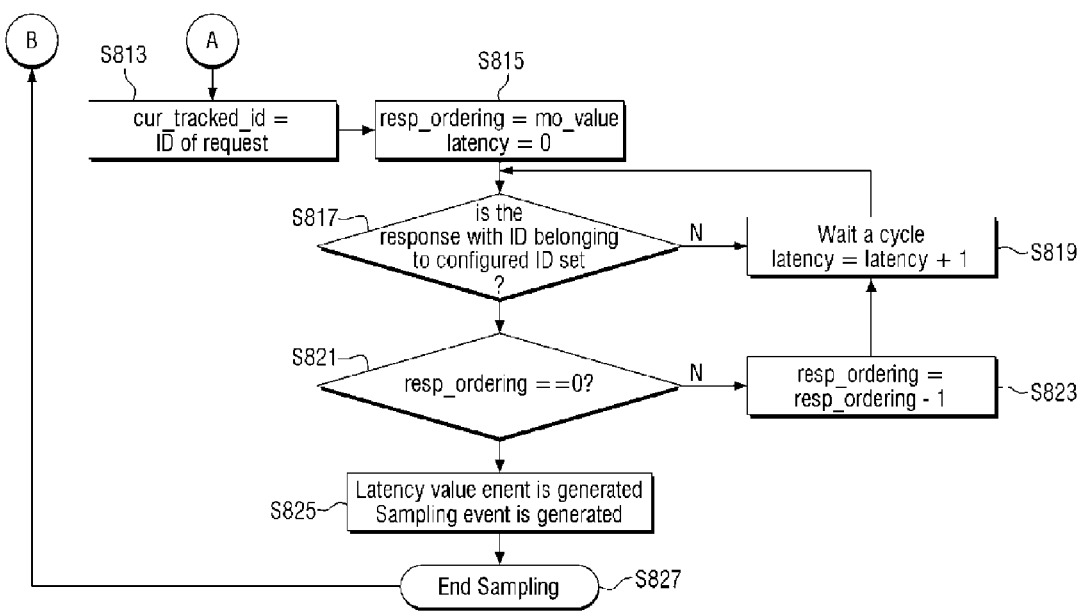

FIG. 8 is a flowchart illustrating the operating method according to the example embodiment of FIG. 7.

Referring to FIG. 8, the operating method according to the present example embodiment includes monitoring multiple request packets and multiple response packets that are being transmitted between a master device and a slave device.

The sampling of the request packets and the response packets is initiated (S801). Thereafter, a determination is made as to whether the channel between the master device and the slave device is idle (S803).

If the channel between the master device and the slave device is idle, a determination is made as to whether a request packet detected over the channel between the master device and the slave device matches ID information provided by the configuration module 210 (S805).

If the detected request packet does not match transaction attribute information included in the ID information provided by the configuration module 210, a determination is made as to whether the detected request packet matches transaction ID information included in the ID information provided by the configuration module 210 (S809). If the detected request packet matches transaction ID information included in the ID information provided by the configuration module 210, current tracked ID information cur_tracked_id provided by the configuration module 210 is set as the ID information provided by the configuration module 210 (S811).

If the channel between the master device and the slave device is idle, a determination is made as to whether the detected request packet matches the current tracked ID information cur_tracked_id (S807). If the detected request packet matches the current tracked ID information, the operating method proceeds to S805.

If a determination is made in S805 that the detected request packet matches the transaction attribute information included in the ID information provided by the configuration module 210, the current racked ID information cur_tracked_id is set as the ID information provided by the configuration module 210 (S813).

Thereafter, the MO count value mo_value of the MO counter 230 is set as the initial count value of the RO counter 240. That is, the MO count value mo_value of 1 is set as the initial count value of the RO counter 240 (S815). Then, the operation of the latency counter 260 is initiated.

Thereafter, a target response packet corresponding to the target request packet is detected. More specifically, a determination is made as to whether a response packet detected over the channel between the master device and the slave device matches the ID information of the target request packet, for example, the transaction ID of the target request packet (S817). If the detected response packet does not match the ID information of the target request packet, the count value of the latency counter 260 is increased by, for example, 1 (S819).

If the detected response packet matches the ID information of the target request packet, the RO count value resp_ordering of the RO counter 240 is checked (S821). If the RO count value resp_ordering is 1 or greater, the RO count value resp_ordering is lowered by, for example, 1 (S823), and latency counting is continued.

On the other hand, if the RO count value resp_ordering is 0, which means that latency counting is completed, a latency value is output (S825).

Thereafter, sampling is completed (S827), and for a new sampling process, the detection of another target request packet that matches the ID information provided by the configuration module 210 is performed again.

In the operating method according to the present example embodiment, the latency of only some transactions is measured using a sampling technique, instead of measuring the latency of each and every transaction individually. Thus, the use of the resources of the semiconductor device 100 such as the MO counter 230, the RO counter 240, and the latency counter 260 can be minimized. Also, a latency value with sufficiently high precision for tasks such as debugging and QoS control can be obtained while conserving the resources of the semiconductor device 100.

For example, to perform tasks such as debugging and QoS control on the semiconductor device 100, an average latency and a peak latency that are computed based on multiple latency values may be used. According to the present disclosure, an average latency and a peak latency with sufficiently high precision can be acquired while consuming only a small amount of resources.

In addition, a target transaction to be subjected to latency measurement can be customized. Thus, tasks such as debugging and QoS control can be performed in a properly customized manner for each individual application environment. For example, by setting an ID value for identifying a particular device as a target transaction ID for latency measurement, latency measurement can be performed only on transactions having a transaction ID desired by a user.

Figure 9:
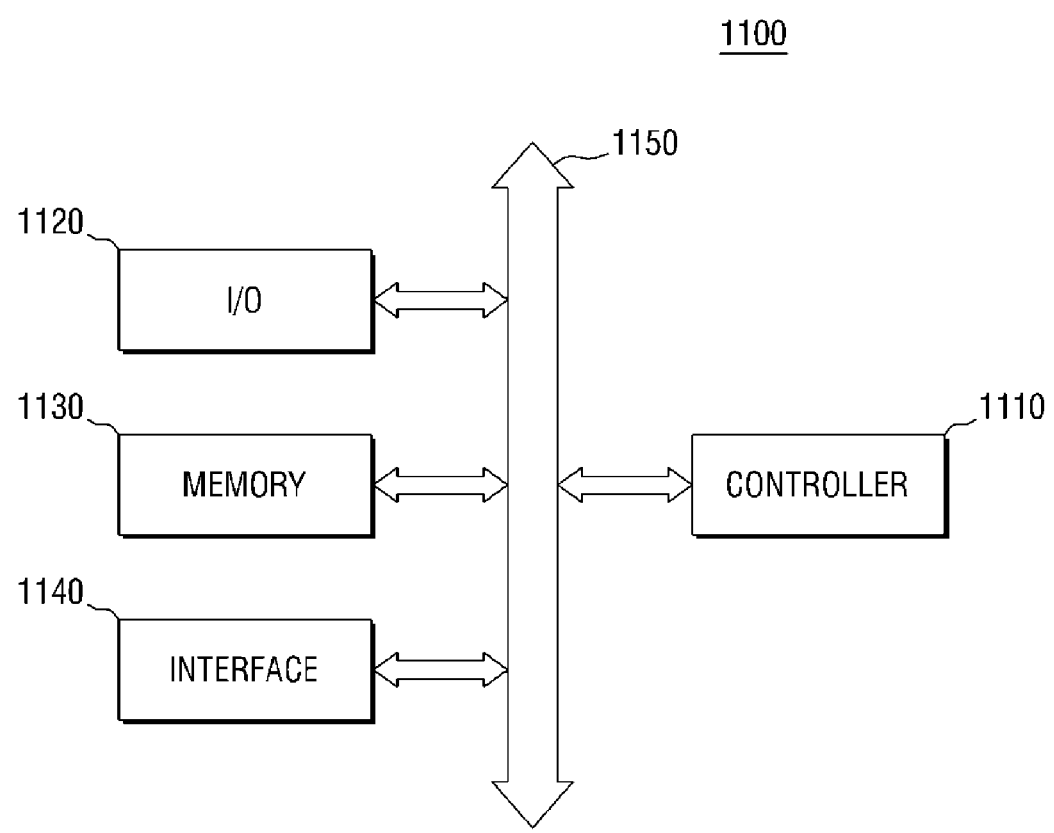
FIG. 9 is a block diagram of a semiconductor system to which a semiconductor device and an operating method of the semiconductor device, according to some example embodiments of the present disclosure, are applicable.

FIG. 9 is a block diagram of a semiconductor system to which a semiconductor device and an operating method of the semiconductor device, according to some example embodiments of the present disclosure, are applicable.

Referring to FIG. 9, a semiconductor system 1100 may include a controller 1110, an input/output (I/O) device 1120, a memory device 1130, an interface 1140, and a bus 1150. The controller 1110, the I/O device 1120, the memory device 1130, and/or the interface 1140 may be connected to one another via the bus 1150. The bus 1150 may be a path via which data is transmitted.

The controller 1110 may include at least one of a microprocessor, a digital signal processor, a microcontroller, and a logic element performing similar functions to a microprocessor, a digital signal processor, or a microcontroller. Examples of the I/O device 1120 include a keypad, a keyboard, a display device, and the like. The memory device 1130 may store data and/or commands. The interface 1140 transmits data to or receives data from a communication network. The interface 1140 may be a wired or wireless interface. Examples of the interface 1140 include an antenna, a wired or wireless transceiver, and the like.

Although not specifically illustrated, the semiconductor system 1100 may also include an operating memory for improving the operation of the controller 1110, such as a high-speed dynamic random access memory (DRAM) and/or static random access memory (SRAM).

A semiconductor device according to some example embodiments of the present disclosure may be provided inside the memory device 1130 or may be provided as part of the controller 1110 or the I/O device 1120.

The semiconductor system 1110 may be applicable to a Personal Digital Assistant (PDA), a portable computer, a web tablet, a wireless phone, a mobile phone, a digital music player, a memory card, or any type of electronic product capable of transmitting and/or receiving information in a wireless environment.

Figure 10:
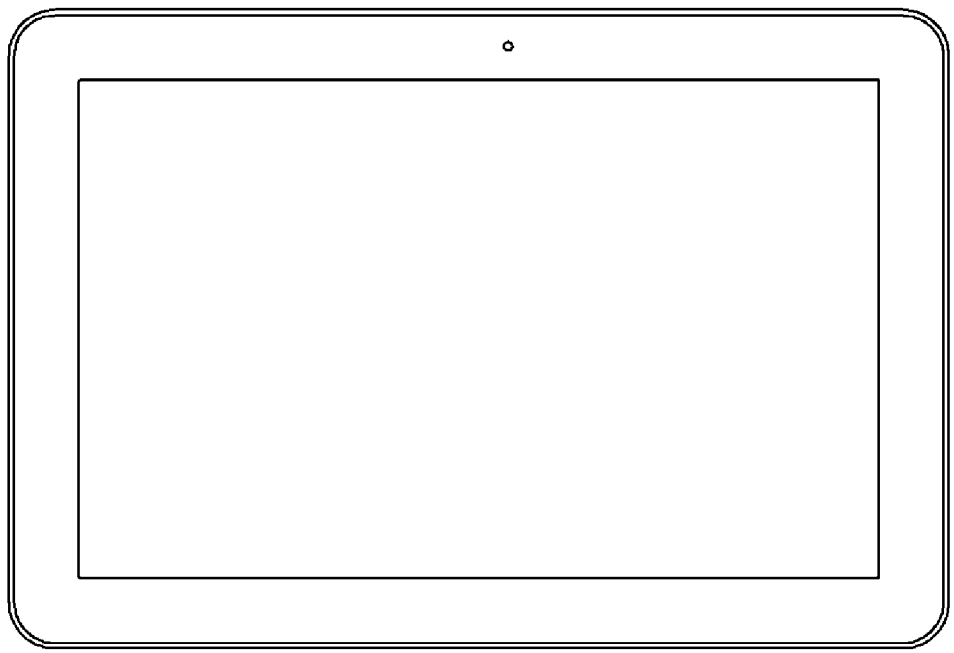
FIGS. 10 through 12 are schematic views illustrating example semiconductor systems to which a semiconductor device and an operating method of the semiconductor device, according to some example embodiments of the present disclosure, are applicable.
Figure 11:
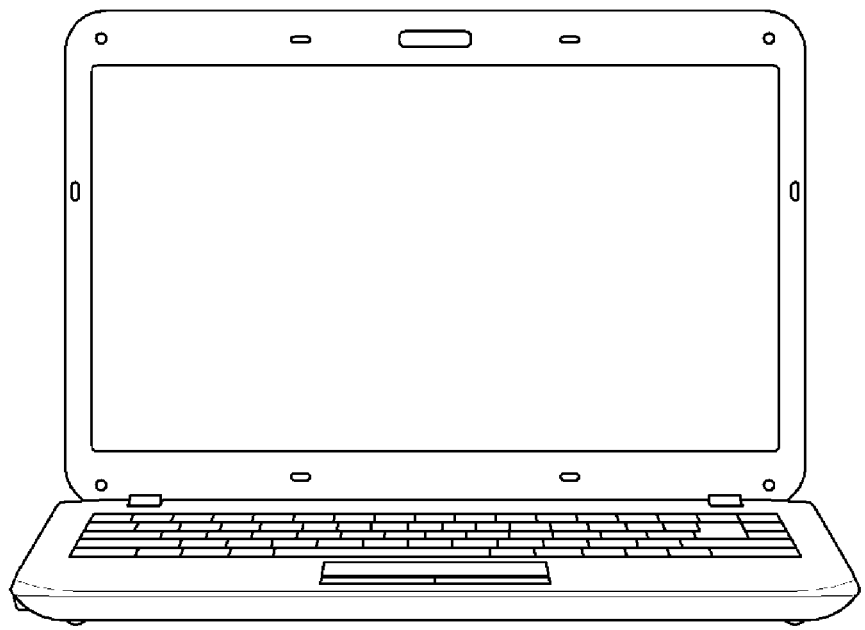
Figure 12:
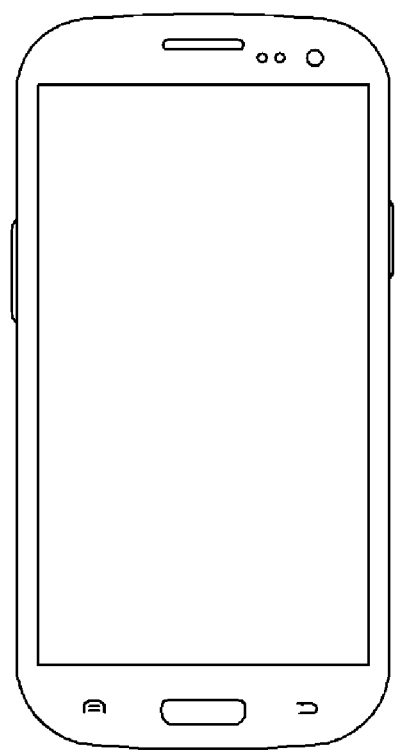

FIGS. 10 through 12 are schematic views illustrating example semiconductor systems to which a semiconductor device and an operating method of the semiconductor device, according to some example embodiments of the present disclosure, are applicable.

More specifically, FIG. 10 illustrates a tablet PC 1200, FIG. 11 illustrates a notebook computer 1300, and FIG. 12 illustrates a smartphone 1400. At least one semiconductor device according to some example embodiments of the present disclosure may be used in the tablet PC 1200, the notebook computer 1300, and the smartphone 1400.

Obviously, a semiconductor device according to some example embodiments of the present disclosure may also be used in various IC devices other than those set forth herein.

That is, only the tablet PC 1200, the notebook computer 1300, and the smartphone 1400 have been described herein as examples of the semiconductor system, but the present disclosure is not limited thereto.

In some example embodiments, the semiconductor system may also be provided as a computer, an Ultra Mobile PC (UMPC), a work station, a net-book computer, a PDA, a portable computer, a wireless phone, a mobile phone, an electronic-book (e-book), a Portable Multimedia Player (PMP), a portable game console, a navigation device, a black box, a digital camera, a 3-dimensional (3D) television set, a digital audio recorder, a digital audio player, a digital picture recorder, a digital picture player, a digital video recorder, or a digital video player.

Although preferred embodiments of the present disclosure have been described for illustrative purposes, those skilled in the art will appreciate that various modifications, additions and substitutions are possible, without departing from the scope and spirit of the present disclosure as set forth in the accompanying claims.

What is claimed is:

1. An operating method of a semiconductor device, comprising:
monitoring a plurality of request packets and a plurality of response packets that are being transmitted between a master device and a slave device, the response packets being transmitted in response to the request packets;
detecting a target request packet that matches predefined identification (ID) information from among the plurality of request packets;
initiating an operation of a latency counter for measuring the latency of a communication exchange that includes the target request packet and a target response packet that is one of the plurality of response packets that matches the predefined ID information;

detecting the target response packet from among the plurality of response packets;

terminating the operation of the latency counter;

acquiring a latency value of the communication exchange from the latency counter;

counting a number of request packets with corresponding response packets that are yet to be detected, from among the plurality of request packets by using a Multiple Outstanding (MO) counter; and determining whether the corresponding response packets have been detected for the plurality of request packets by using a Response Ordering (RO) counter.

2. The operating method of claim 1, wherein the initiating the operation of the latency counter comprises setting an MO count value of the MO counter as an initial count value of the RO counter.

3. The operating method of claim 1, wherein an RO count value of the RO counter is lowered whenever the corresponding response packet is detected for any one of the plurality of request packets, and wherein the terminating the operation of the latency counter comprises terminating the operation of the latency counter if the RO count value of the RO counter reaches 0.

4. The operating method of claim 1, wherein the predefined ID information includes at least one of transaction identification information and transaction attribute information.

5. The operating method of claim 4, wherein the transaction identification information includes unique identification information for identifying the master device or the slave device.

6. The operating method of claim 4, wherein the transaction attribute information includes at least one of burst length attribute information and cache snooping type attribute information.

7. The operating method of claim 1, wherein:

the master device is an Intellectual Property (IP) block provided in a System-on-Chip (SoC); and the master device and the slave device exchange the plurality of request packets the plurality of response packets via an On-Chip Interconnect (OCI).

8. The operating method of claim 7, further comprising:

receiving the predefined ID information, which is set in advance by a user or an application, from outside the SoC.

9. The operating method of claim 1, further comprising:

configuring current tracked identification information based on the predefined ID information, wherein the detecting the target request packet comprises determining a state of a channel formed between the master device and the slave device, detecting a request packet that matches the predefined ID information as the target request packet if the channel is idle, and detecting a request packet that matches the current tracked identification information as the target request packet if the channel is busy.

10. The operating method of claim 9, further comprising:

updating the current tracked identification information if the channel is switched from an idle state to a busy state.

11. The operating method of claim 1, wherein:

the communication exchange includes a first transaction and a second transaction, which is different from the first transaction; and the acquiring the latency value of the communication exchange comprises acquiring a first latency value of the first transaction and a second latency value of the second transaction and computing an average latency and a peak latency based on the first latency value and the second latency value.

12. An operating method of a semiconductor device, comprising:

monitoring a plurality of communication exchanges between a first Intellectual Property (IP) block and a second Intellectual Property (IP) block, which are provided in a System-on-Chip (SOC), and that each include a request and a responsive response to the request;

receiving predefined first ID information and predefined second ID information from outside the System-on-Chip;

measuring the latency of a first transaction that is one of the plurality of communication exchanges that matches the first ID information by using a latency counter;

measuring the latency of a second transaction that is one of the plurality of communication exchanges that matches the second ID information by using the latency counter; and computing an average latency and a peak latency based on the measured latency of the first transaction and the measured latency of the second transaction, wherein the request in each of the plurality of communication exchanges includes a request packet and the responsive response to the request in each of the communications exchanges includes a response packet corresponding to the request packet and transmitted in response to the corresponding request packets;

counting a number of request packets with corresponding response packets that are yet to be detected, in connection with the first and second transactions, by using a Multiple Outstanding (MO) counter; and determining whether the corresponding response packets have been detected, by using a Response Ordering (RO) counter.

13. The operating method of claim 12, wherein:

an RO count value of the RO counter is lowered whenever the corresponding response packet is detected; and the latency counter stops counting if the RO count value of the RO counter reaches 0.

14. A semiconductor device, comprising:

a filtering module that detects a target request packet that matches predefined identification (ID) information from among a plurality of request packets that are being transmitted between a master device and a slave device;

a configuration module that receives the predefined ID information and that provides the predefined ID information to the filtering module;

a latency counter that measures the latency of a communication exchange including the target request packet and a target response packet that is one of a plurality of response packets that matches the predefined ID information and that is transmitted in response to the target request packet; and a control module that controls an operation of the latency counter and detects the target response packet from among the plurality of response packets, a Multiple Outstanding (MO) counter that counts a number of request packets with corresponding response packets that are yet to be detected, from among the plurality of request packets; and a Response Ordering (RO) counter that determines whether the corresponding response packets have been detected for the plurality of request packets.

* * * * *